US011208168B2

(12) United States Patent
Hedlund et al.

(10) Patent No.: US 11,208,168 B2
(45) Date of Patent: Dec. 28, 2021

(54) TUNNEL STUD PROTECTION SYSTEM FOR A SNOWMOBILE

(71) Applicant: Polaris Industries Inc., Medina, MN (US)

(72) Inventors: Michael A. Hedlund, Roseau, MN (US); Matthew J. Prusak, Slaol, MN (US)

(73) Assignee: Polaris Industries Inc., Medina, MN (US)

( * ) Notice: Subject to any disclaimer, the term of this patent is extended or adjusted under 35 U.S.C. 154(b) by 132 days.

(21) Appl. No.: 16/723,745

(22) Filed: Dec. 20, 2019

(65) Prior Publication Data

US 2021/0188381 A1 Jun. 24, 2021

(51) Int. Cl.
*B62J 13/02* (2006.01)
*B62K 19/44* (2006.01)
*B60K 11/06* (2006.01)
*B62K 19/04* (2006.01)
*B62K 19/24* (2006.01)

(52) U.S. Cl.
CPC ............... *B62J 13/02* (2013.01); *B60K 11/06* (2013.01); *B62K 19/04* (2013.01); *B62K 19/24* (2013.01); *B62K 19/44* (2013.01)

(58) Field of Classification Search
CPC .......... B60K 11/06; B62J 13/02; B62K 19/04; B62K 19/24
USPC ........................................................ 180/190
See application file for complete search history.

(56) References Cited

U.S. PATENT DOCUMENTS

2003/0150658 A1\* 8/2003 Nakano ................. B62M 27/02
180/190

\* cited by examiner

*Primary Examiner* — Kevin Hurley
*Assistant Examiner* — Felicia L. Brittman
(74) *Attorney, Agent, or Firm* — Harness, Dickey & Pierce P.L.C.

(57) ABSTRACT

A snowmobile tunnel stop protection system to provide protection to a tunnel from a studded endless track used on a snowmobile. The tunnel includes at least one slot formed into an undersurface of the tunnel. At least one protection rail extends from a first end to a second end and includes a plurality of holes passing through the protection rail. A plurality of fasteners are used to attach the protection rail to the tunnel where each fastener has a first fastener portion that passes through the at least one slot. Each fastener includes the first fastener portion that passes through one of the plurality of holes and a second fastener portion that couples to the corresponding first fastener portion to couple the protection rail to the slot formed in the tunnel.

20 Claims, 14 Drawing Sheets

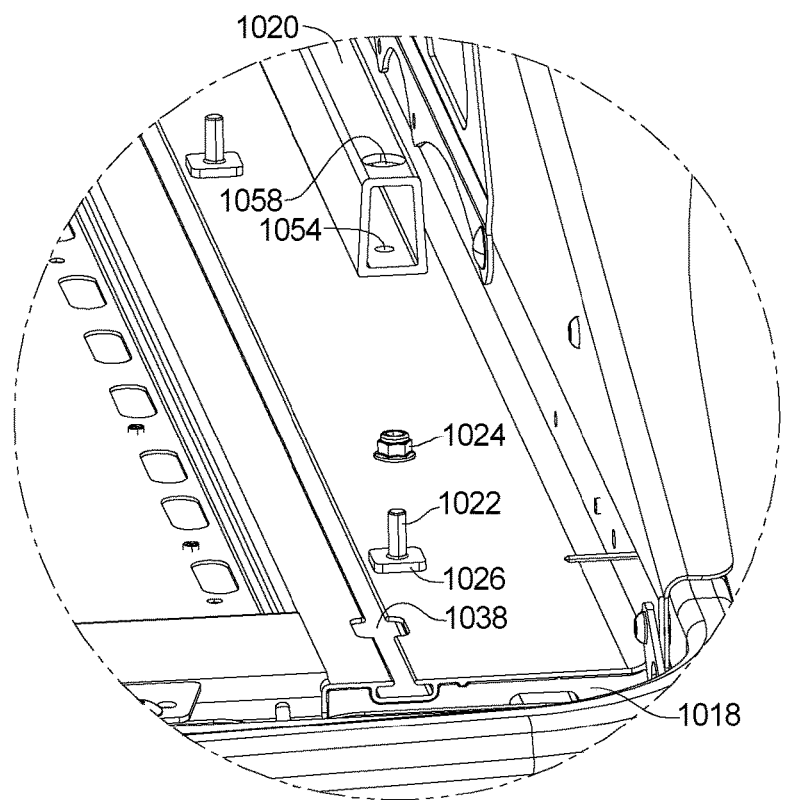
FIG. 9
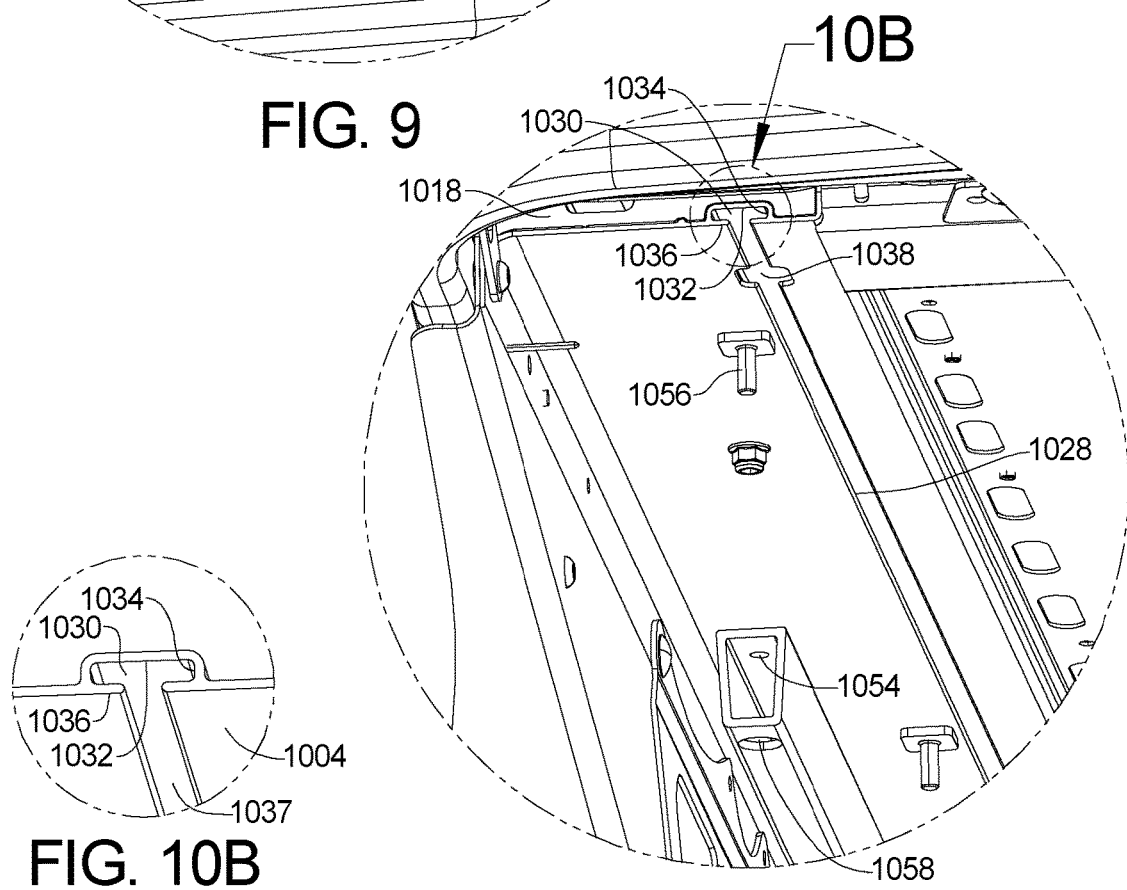
FIG. 10B
FIG. 10A

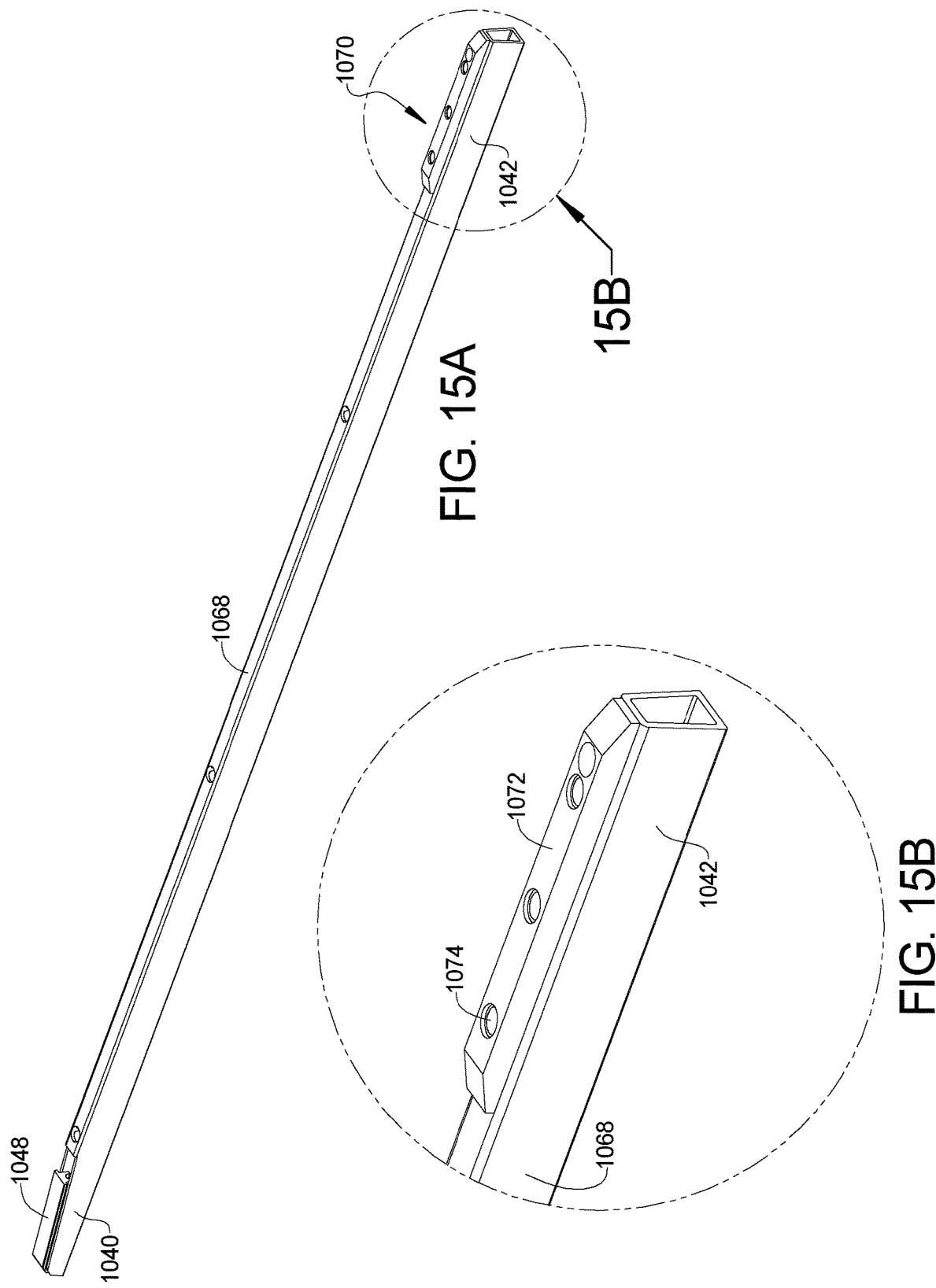

TUNNEL STUD PROTECTION SYSTEM FOR A SNOWMOBILE

CROSS-REFERENCE TO RELATED APPLICATIONS

This application includes related subject matter similar to that disclosed in concurrently filed: (1.) U.S. patent application Ser. No. 16/723,754; (2.) U.S. patent application Ser. No. 16/723,789; (3.) U.S. patent application Ser. No. 16/723,777; and (4.) U.S. patent application Ser. No. 16/723,834. The entire disclosures of each of the above applications are incorporated herein by reference.

FIELD

The present disclosure relates to stud protection for a tracked vehicle, and, more particularly, to a tunnel stud protection system for use on a snowmobile.

BACKGROUND

This section provides background information related to the present disclosure which is not necessarily prior art.

Tracked vehicles, such as a snowmobile, generally include a pair of front skis for steering and a rear endless track for driving or propelling the snowmobile. A chassis or body, of the snowmobile includes a tunnel that is positioned over the track to support a seat and prevent snow from hitting the snowmobile occupants.

Snowmobiles can traverse various terrain and conditions. Some of these conditions may require or be helpful to include studs on the track to provide better stability and performance for the snowmobile. Such conditions can include driving on ice or hard packed snow where studs are able to bite into such terrain and provide gripping in turns and other conditions.

Snowmobiles can generally either be air cooled or liquid cooled machines. If liquid cooled, fluid channels are generally formed into the snowmobile tunnel to circulate the cooling fluid. This enables the cooling fluid to be exposed or pass through the tunnel that is exposed to cool air, as well as snow contacting the underside of the tunnel, thereby cooling the cooling fluid and thus the engine of the snowmobile.

Because the tunnel is generally covering the track about the top and sides of the track, the inside of the tunnel is generally exposed to the studs on a studded track. In order to prevent the studs from contacting the underside of the tunnel and possibly puncturing or damaging the cooling channels or conduits within the tunnel, stud protection systems have been employed within tunnels of snowmobiles. These stud protection configurations generally include structural members that extend downward and project out from inside the tunnel to which plastic protectors are attached.

Such stud protection configurations, however, may have various disadvantages. For example, structural portions extending into the tunnel are always present whether or not the plastic stud protection devices are attached thereto. This can reduce the overall internal clearance inside the tunnel, thereby potentially reducing the types of tracks that may be used with the tunnel, such as tracks having deep lugs. Additionally, the plastic stud protection devices attach to the internal structure in the tunnel and generally do not conduct heat and thus may reduce performance and reduce cooling of the cooling fluid. This may cause the underside of the tunnel to develop thick layers of ice which is also undesirable. Still further, by providing or attaching essentially a plastic insulator over the cooling channels, a large area of the cooling channels can be essentially blocked by an insulating device. Accordingly, there is a need to provide an improved snowmobile tunnel stud protection system that reduces or eliminates the disadvantages noted above.

SUMMARY

This section provides a general summary of the disclosure, and is not a comprehensive disclosure of its full scope or all of its features.

A snowmobile tunnel stud protection system to provide protection from a studded endless track. The tunnel stud protection system includes a tunnel that extends along a longitudinal axis from a first proximal tunnel end to a second distal tunnel end. The tunnel defines at least one slot formed into an undersurface of the tunnel. At least one protection rail extends from a first proximal rail end to a second distal rail end. The at least one protection rail defines a plurality of holes that pass through the protection rail. A plurality of fasteners are used where each fastener has a first fastener portion and a second fastener portion. The first fastener portion is configured to slide along the at least one slot and the second fastener portion is coupled to the first fastener portion. Each first fastener portion passes through one of the plurality of holes. Each second fastener portion couples to a corresponding first fastener portion of each fastener to couple the protection rail to the slot formed in the tunnel.

A snowmobile tunnel stud protection system to provide protection to a tunnel from a studded endless track. The tunnel includes at least one slot that is formed into an undersurface of the tunnel. At least one protection rail extends from a first proximal rail end to a second distal rail end. The at least one protection rail includes a tunnel engaging wall and a spaced apart opposed track engaging wall with a pair of opposed rail sidewalls connecting the tunnel engaging wall and the track engaging wall to define an airflow passthrough extending along a length of the protection rail. The tunnel engaging wall defines a plurality of tunnel engaging holes and the track engaging wall defines a plurality of track engaging holes. A plurality of bolts are configured to be positioned in the slot formed in the undersurface of the tunnel with each bolt configured to pass through a corresponding tunnel engaging hole. The plurality of nuts used with the plurality of bolts, with each nut configured to attach to a corresponding bolt and each nut is sized to pass through a corresponding track engaging hole. Each nut couples to a corresponding bolt to attach the at least one protection rail to the tunnel.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 9 is an enlarged exploded perspective view of a portion of the tunnel stud protection system taken about portion 9 illustrated in FIG. 7;

FIG. 10A is an enlarged exploded perspective view of a portion of the tunnel stud protection system taken about portion 10 illustrated in FIG. 8;

FIG. 10B is an enlarged perspective view of a portion of the tunnel stud protection system taken about portion 10A illustrated in FIG. 10A;

FIG. 15A is a perspective view of another embodiment of a tunnel stud protection rail according to the present disclosure; and FIG. 15B is an enlarged perspective view taken about portion 15B of FIG. 15A.

Corresponding reference numerals indicate corresponding parts throughout the several views of the drawings.

DETAILED DESCRIPTION

Figure 1:
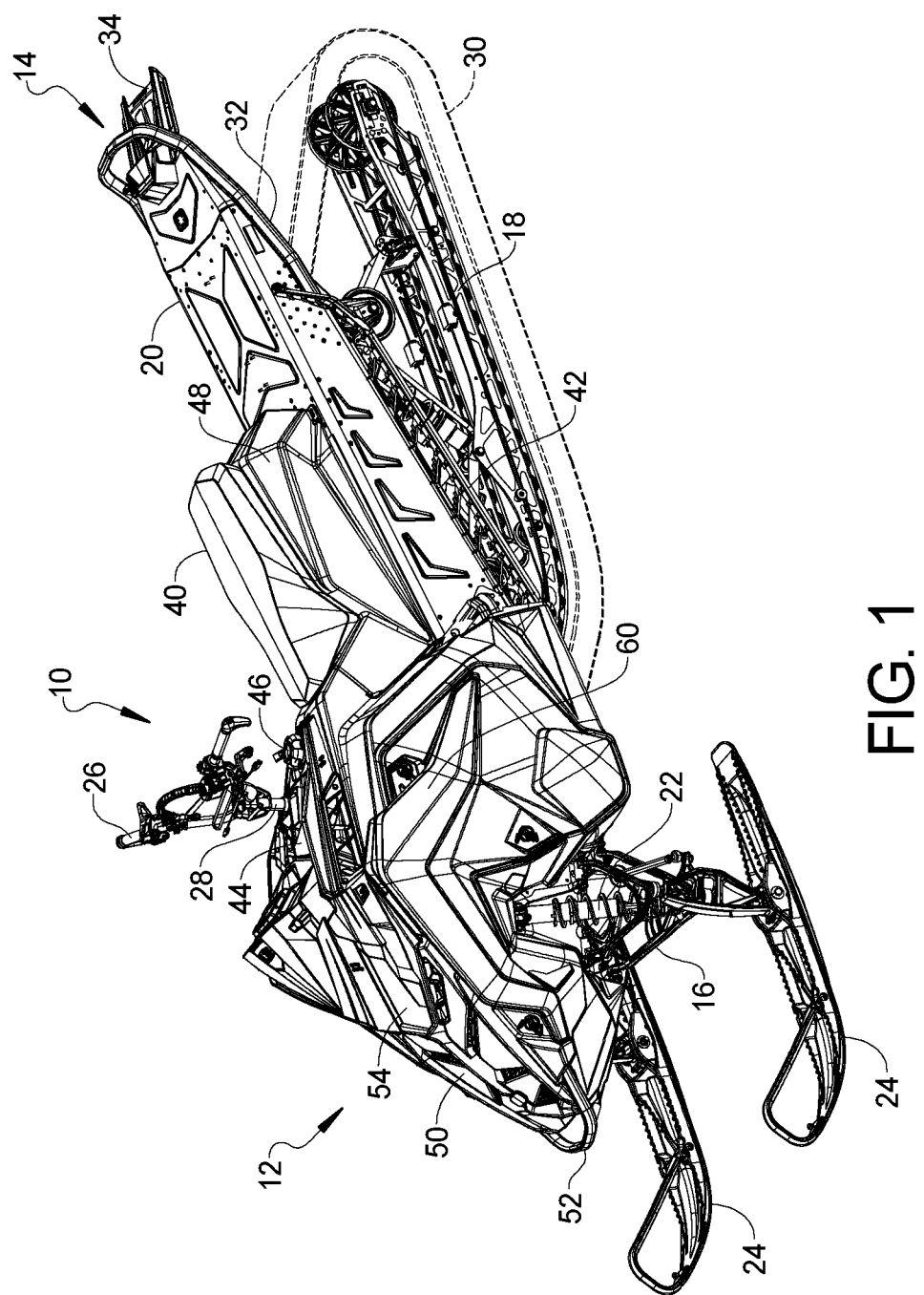
FIG. 1 is a perspective view of an exemplary snowmobile in accordance with the present disclosure.
Figure 2:
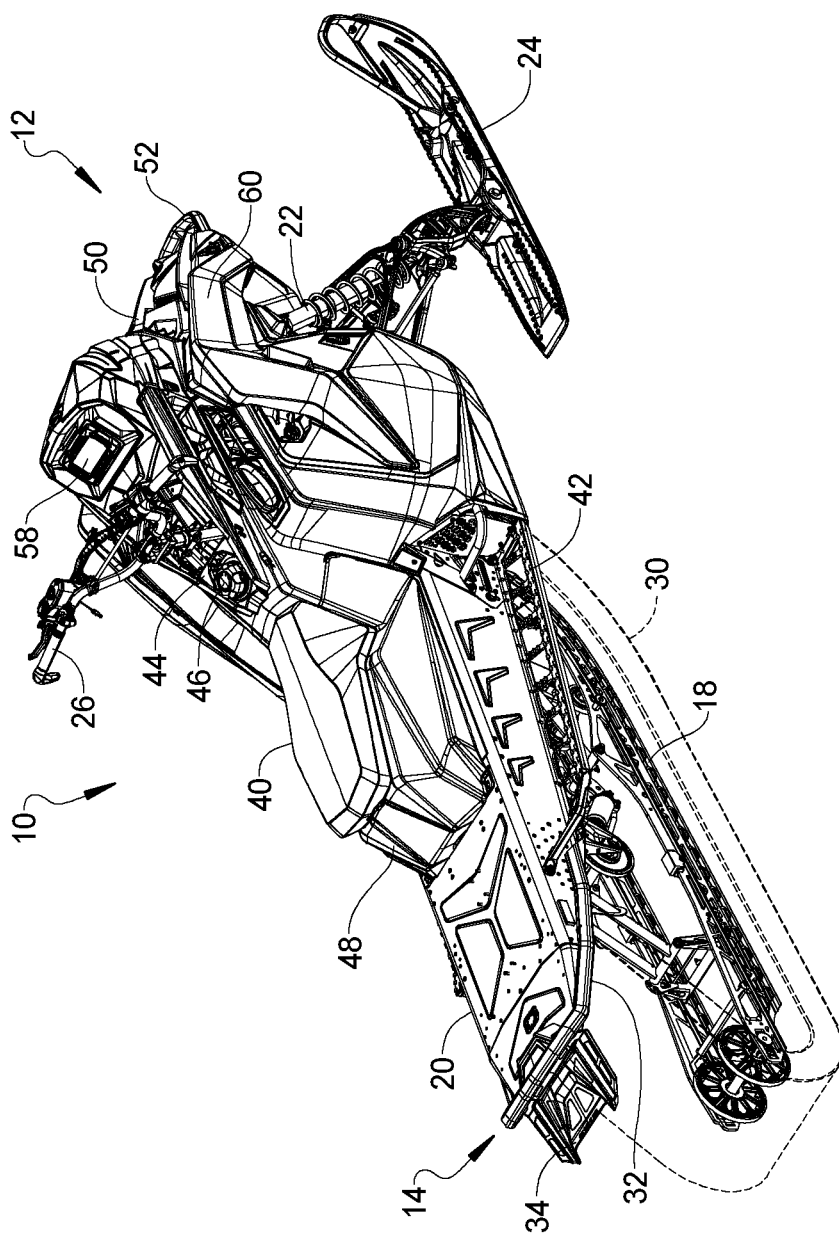
FIG. 2 is another perspective view of the snowmobile of FIG. 1.
Figure 3:
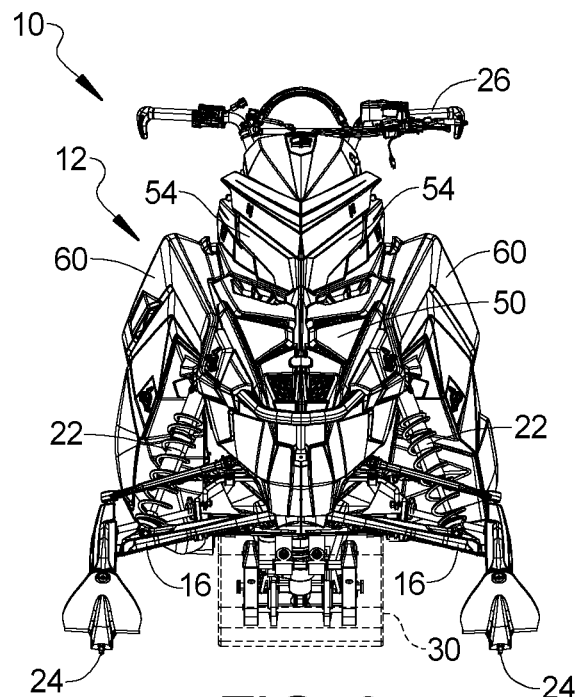
FIG. 3 is a front view of the snowmobile of FIG. 1.
Figure 4:
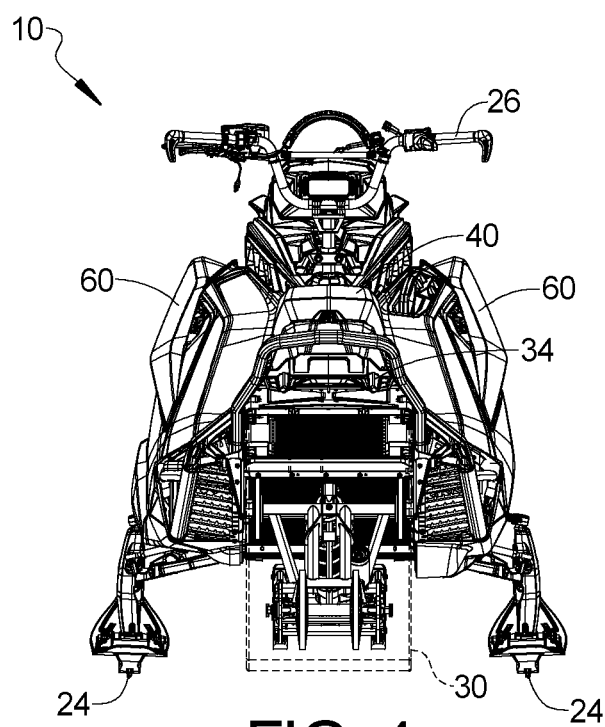
FIG. 4 is a rear view of the snowmobile of FIG. 1.
Figure 5:
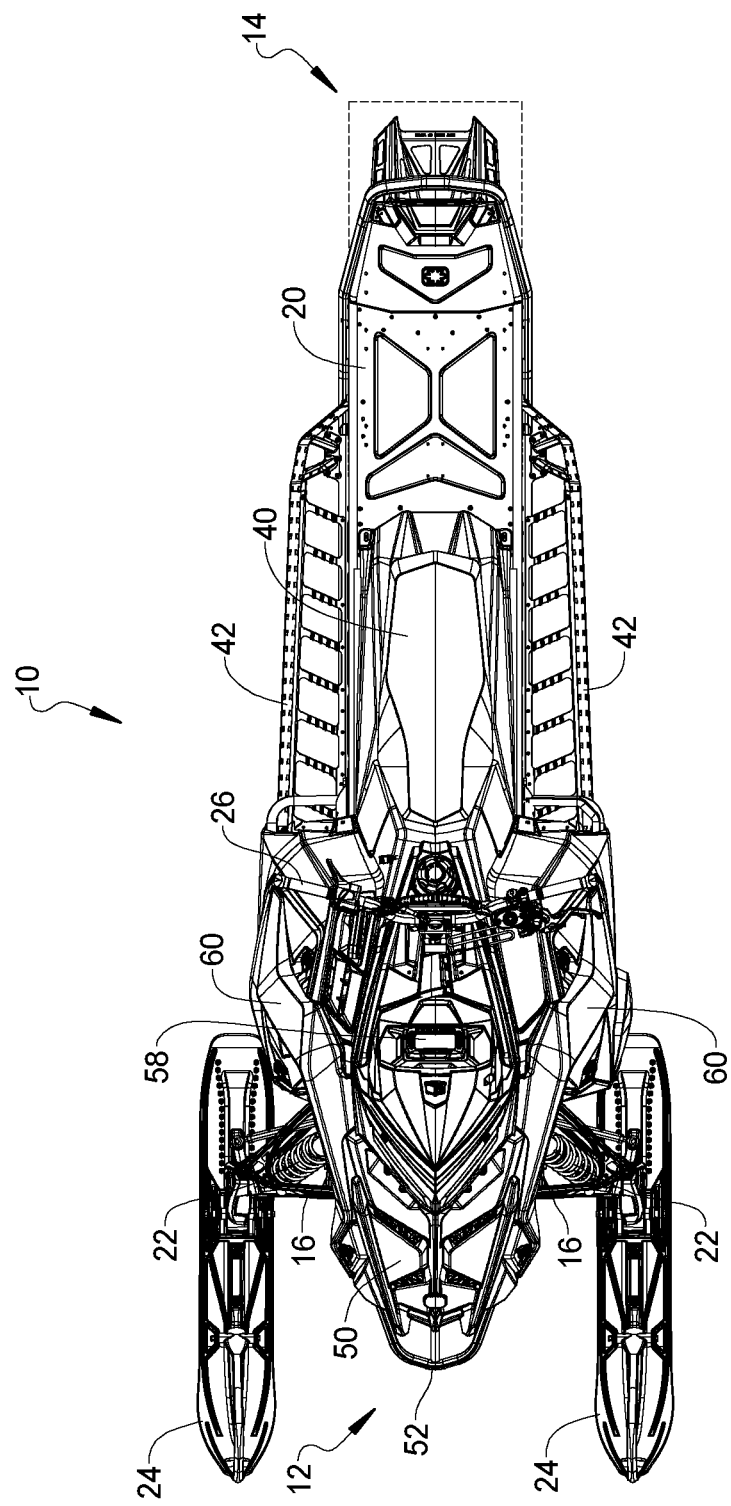
FIG. 5 is a top view of the snowmobile of FIG. 1.

Example embodiments will now be described more fully with reference to the accompanying drawings.

With initial reference to FIGS. 1-6, an exemplary vehicle in accordance with the present disclosure is illustrated. Although the vehicle is illustrated as a snowmobile 10, numerous aspects of the present disclosure may be included with any other suitable vehicle as well. The snowmobile 10 may be any suitable type of snowmobile, such as any suitable trail snowmobile, sport trail snowmobile, touring snowmobile, performance snowmobile, utility snowmobile (such as any snowmobile suitable for search and/or rescue, law enforcement, military operations, etc.), crossover snowmobile, mountain snowmobile, youth snowmobile, etc.

The snowmobile 10 generally includes a front end 12 and a rear end 14. At the front end 12 is a front suspension 16. At the rear end 14 is a rear suspension 18. The front suspension 16 and the rear suspension 18 support a chassis 20.

The front suspension 16 includes shock absorbers 22, each one of which is connected to a ski 24. The shock absorbers 22 may be any dampening devices suitable for absorbing shock resulting from the skis 24 passing over uneven terrain. The skis 24 are steered in part by a suitable steering device, such as handlebars 26.

Coupled to the rear suspension 18 is a belt or track 30, which is an endless or continuous belt or track 30. Rotation of the track 30 propels the snowmobile 10. The track 30 is circulated through a tunnel 32 defined at least in part by the chassis 20. The tunnel 32 is tapered at the rear end 14, as described in detail herein. Mounted at the rear end 14 is a flap 34, which blocks snow and other debris from being "kicked-up" by the track 30.

Mounted to the chassis 20 and atop the tunnel is a seat 40 for the operator of the snowmobile 10. On both sides of the chassis 20 or tunnel 32 are footrests 42, upon which the operator may rest his or her feet when seated on the seat 40. The seat 40 is positioned to allow the driver to grasp the handlebars 26 for steering the snowmobile 10. The handlebars 26 are mounted to a steering rod 28, which protrudes out from within the center console 44. At the center console 44 is a fuel cap 46 of a fuel tank 48. Any suitable accessory 36 (see FIG. 6) may be mounted to the chassis 20 behind the seat 40.

At the front end 12 of the snowmobile 10 is a hood assembly 50, which is mounted on top of a nose pan 68. Mounted to the hood assembly 50 and protruding from a forwardmost end thereof, is a front bumper 52. The hood assembly 50 houses headlights 54. An optional windshield 56 is connected to an uppermost portion of the hood assembly 50, as described in detail herein. Associated with the hood assembly 50 is a display 58 viewable by the operator when seated on the seat 40. Mounted to opposite sides of the hood assembly are body panels 60, which are advantageously interchangeable.

Figure 6:
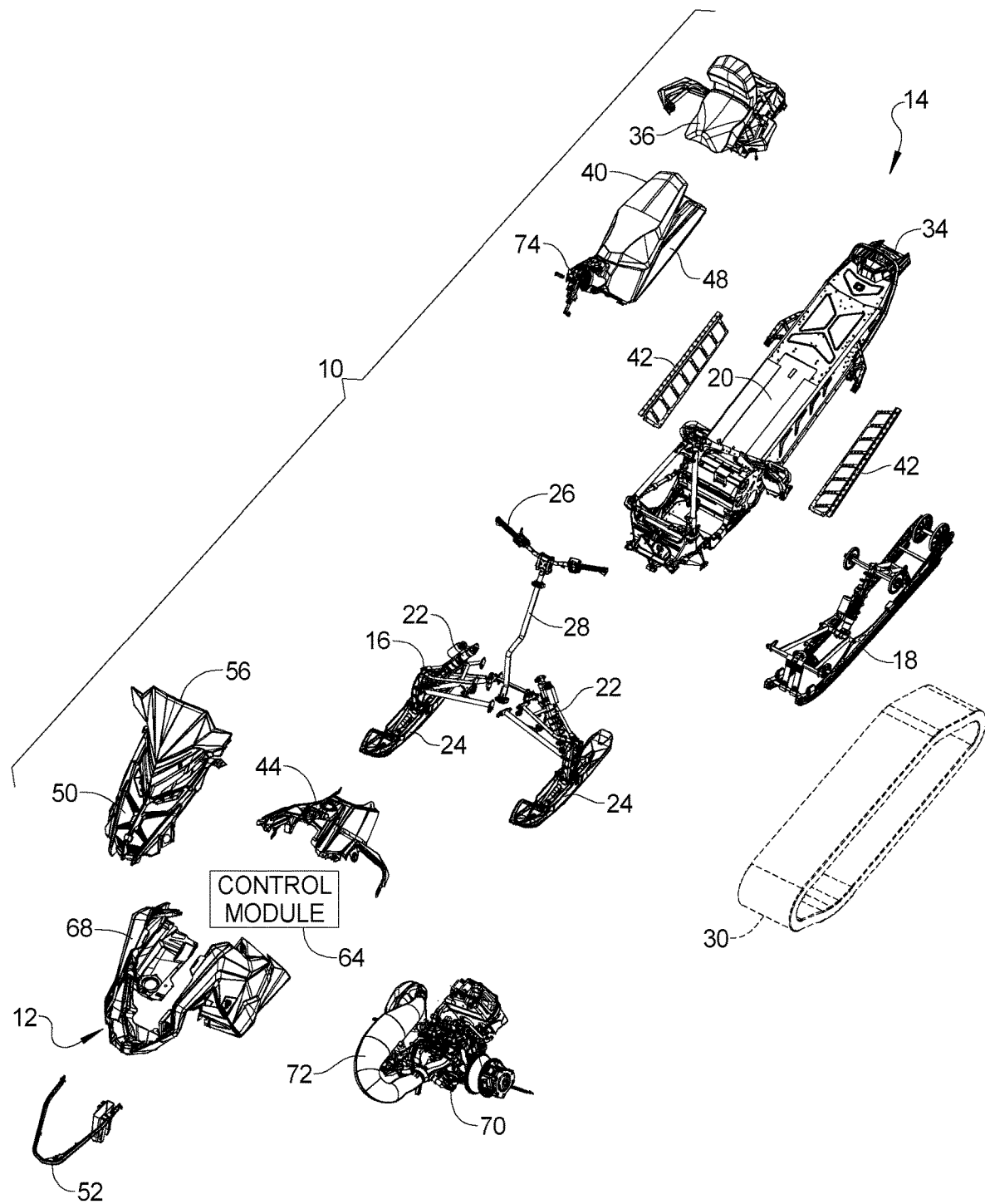
FIG. 6 is an exploded view of the snowmobile of FIG. 1.

With particular reference to FIG. 6, the snowmobile 10 further includes an engine assembly 70. The engine assembly 70 generates power for driving the track 30. The engine assembly 70 may include any suitable engine, such as an electric, 2-stroke, and 4-stroke engine. Coupled to the engine assembly 70 is an exhaust assembly 72. Any suitable exhaust assembly may be used. Oil for the engine assembly 70 is stored in an oil tank assembly 74, which may be arranged proximate to the seat 40.

The snowmobile 10 further includes any suitable control module 64. The control module 64 may be arranged at any suitable location, such as within the hood assembly 50, beneath the center console 44, or within any suitable control mounted to the handlebars 26. The term "control module" may be replaced with the term "circuit." The term "control module" may refer to, be part of, or include processor hardware (shared, dedicated, or group) that executes code and memory hardware (shared, dedicated, or group) that stores code executed by the processor hardware. The code is configured to provide the features of the control module described herein. The term memory hardware is a subset of the term computer-readable medium. The term computer-readable medium, as used herein, does not encompass transitory electrical or electromagnetic signals propagating through a medium (such as on a carrier wave). The term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

Turning to FIGS. 7-10B, the snowmobile tunnel stud protection system 1000 is illustrated in both an assembled and exploded view. As illustrated, the tunnel stud protection system 1000 is attached to the tunnel 32. The tunnel 32 is illustrated in FIGS. 7-10B with a non-tapered distal end. However, the stud protection system can be employed with the tunnel 32, illustrated in FIGS. 1-6, having the tapered distal end as well. In this regard, the tunnel 32 includes a top or upper surface 1002 where the seat 40 is attached. The tunnel 32 includes a lower or bottom surface 1004 where the tunnel stud protection system 1000 is attached. The tunnel 32 extends from a first proximal end 1006 to a second distal end 1008. The tunnel 32 is substantially planar from the first proximal end 1006 to the second distal end 1008. Positioned adjacent the first proximal end 1006 is a curved track protection cover 1010. Extending along each side of the tunnel 32 is a first side wall 1012 and a second opposed side wall 1014, each angled substantially perpendicular to a top plate 1016 of the tunnel 31. The top plate 1016 includes the upper surface 1002 and the lower surface 1004.

The engine assembly 70 of the illustrated snowmobile 10 is a liquid cooled engine assembly 70. Because of this, the tunnel 32 includes cooling ducts or passages 1018 that extend along the tunnel 32 and are formed integral with the top plate 1016. As illustrated, the cooling ducts 1018 extend from the first proximal end 1006 to the second distal end 1008 along each side of the tunnel 32 adjacent to the first side wall 1012 and the second side wall 1014. The cooling ducts 1018 are closed at the second distal end 1008. This enables cooling fluid to circulate through the cooling ducts 1018 substantially along the entire length of the tunnel 32 providing a large surface area for cooling the cooling fluid that passes through the ducts 1018. This is enabled by the fact that the track 30 is covered by the tunnel 32 and as the snowmobile 10 is propelled, snow from the track 30 will be thrown up and contact the lower surface 1004 of the tunnel 32 and hence contact the cooling ducts 1018 that extend along the length of the tunnel 32. This snow, as well as air flow along this area, provides proper cooling of the cooling fluid that passes through the cooling ducts 1018. In this regard, the cooling ducts 1018 form essentially elongated rectangular channels, as illustrated, that extend along substantially the length of the tunnel 32 for housing and circulating the cooling fluid.

In order to protect the tunnel 32 and particularly the lower surface 1004 of the tunnel 32 and particularly the cooling ducts 1018 from potential damage of a studded track 30 contacting this lower surface 1004, the tunnel stud protection system 1000 is employed. It should also be noted that the tunnel stud protection system 1000 could also be used on a tunnel that does not include cooling ducts 1018. The tunnel stud protection system 1000 includes a pair of protection rails 1020 that are attached to the under surface or lower surface 1004 of the tunnel 32 by way of fasteners, such as a first fastener portion being a bolt 1022 and a second fastener portion being a nut 1024. Other types of fasteners could also be used such as rivets, quick release members, pins, etc. Each bolt 1022 includes a rectangular or square head 1026 and is threaded to threadably receive the nut 1024 which is a locking nut.

In order to attach each protection rail 1020 to the lower surface 1004 of the tunnel 32, an elongated attachment channel 1028 that extends from the first end 1006 to the second end 1008 is formed flush into the pair of cooling ducts 1018. As illustrated clearly in FIGS. 9-10B, the attachment channel 1028 defines a substantially T-shaped slot 1030. The T-shaped slot 1030 is defined by an upper surface 1032 and a pair of opposed parallel side walls 1034 and a pair of ledges 1036 that define an opening 1037. While a T-shaped slot 1030 is illustrated, any other appropriate shaped slot could be used, such as L-shaped, V-shaped, etc. As illustrated in FIG. 10B, slotted opening 1037 is flush with the undersurface or lower surface 1004. In other words, no projections extend out or proud of the lower surface 1004 when the tunnel stud protection system 1000 is not used. Passing through the opposed ledges 1036 is a rectangular shaped passage or opening 1038 that is sized to receive the square head 1026 of bolt 1022 in a substantially perpendicular manner. This enables multiple bolts 1022 having rectangularly square shaped heads 1026 to be passed through passage 1038 and slid along the T-shaped slot 1030 to corresponding appropriate positions for attaching the corresponding protection rail 1020 to the tunnel 32. Moreover, by providing the opposed parallel side walls 1034 within the T-shaped slot 1030, the square head 1026 is prevented from rotating or is rotationally locked within the T-shaped slot 1030, thereby enabling easy fixation of the corresponding protection rail 1020 by way of the locking nut 1024, further discussed herein.

As illustrated in FIGS. 7-10B, the protection rail 1020 illustrates how each recessed attachment channel 1028 or T-shaped slot 1030 is recessed into the corresponding cooling duct 1018. Such a configuration provides a flush or non-extending attachment channel 1028 where an attachment mechanism does not project out into the tunnel 32 where the track 30 is positioned, thereby providing significant clearance for many shaped tracks 30, particularly having various shaped lugs. This allows various deep lug tracks 30 to be utilized without clearance concerns when the track 30 is not studded. In other words, the under or lower surface 1004 provides a substantially planar or non-obstructed flush tunnel when the tunnel stud protection system 1000 is not used or employed.

Figure 13A:
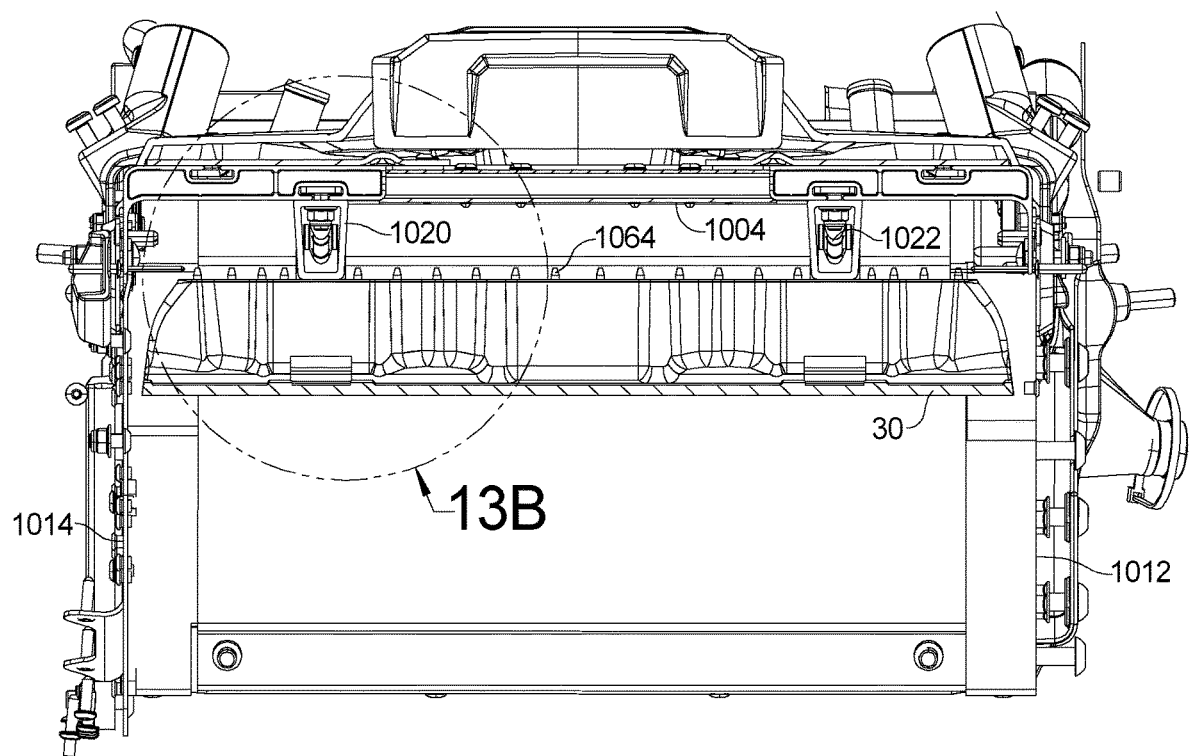
FIG. 13A is a cross-sectional view of the tunnel step protection system taken along line 13-13 of FIG. 11.
Figure 13B:
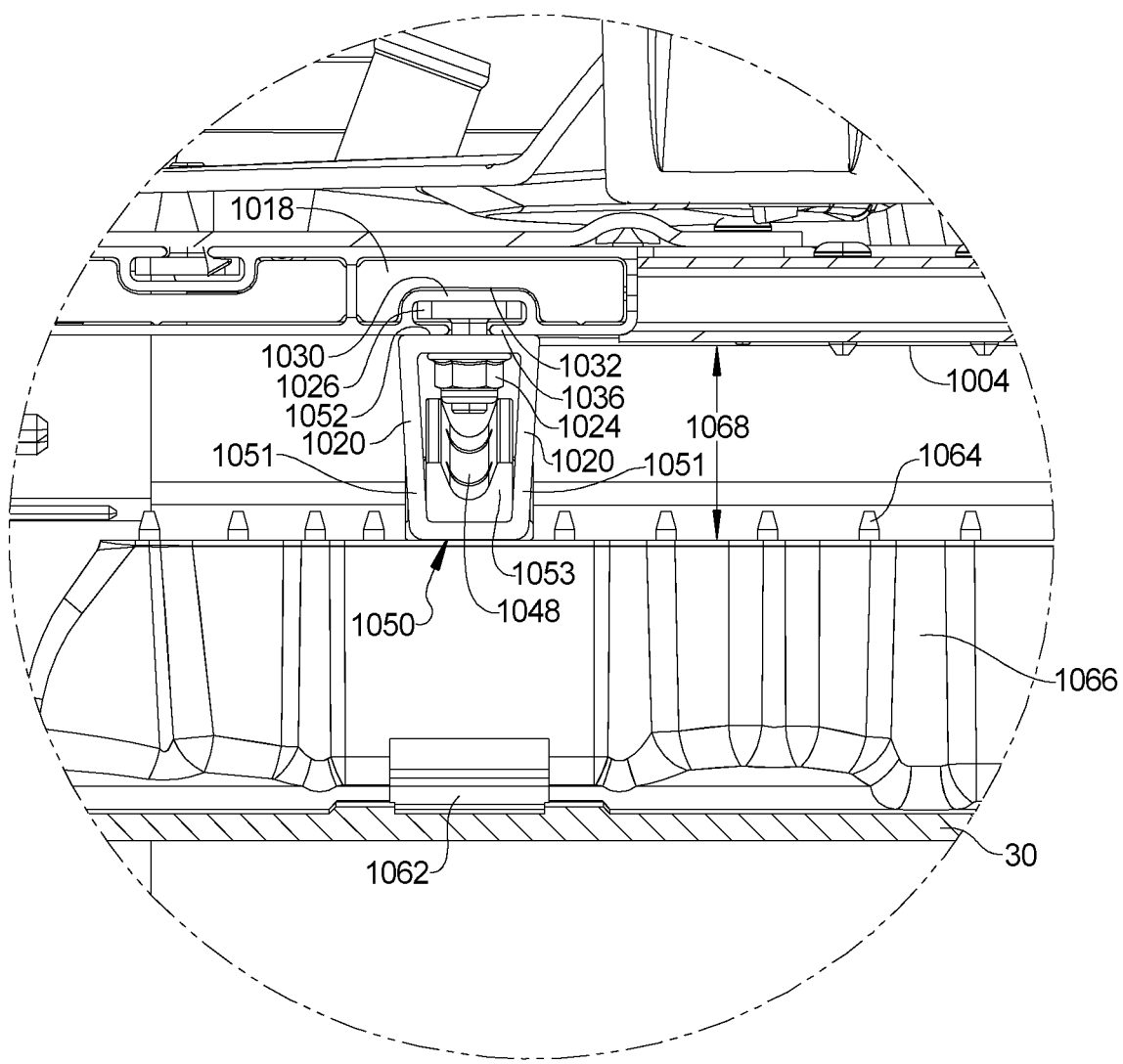
FIG. 13B is an enlarged cross-sectional view taken about portion 13B of FIG. 13A.
Figure 14:
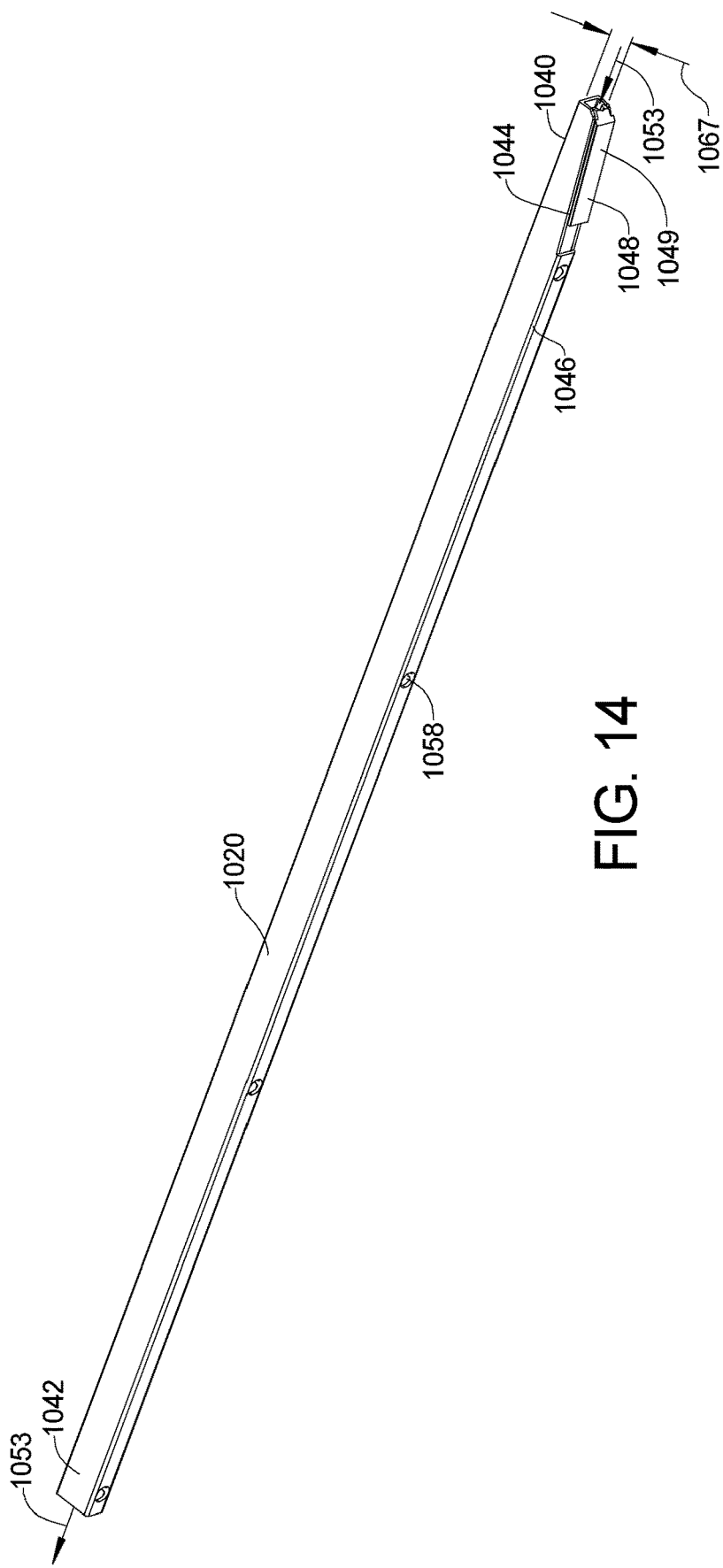
FIG. 14 is a perspective view of a tunnel stud protection rail according to the present disclosure.

Turning to FIGS. 13B and 14, the protection rail 1020 is illustrated in further detail. As noted in FIGS. 7-10, two protection rails 1020 extend along a pair of attachment channels 1028 formed in the pair of cooling ducts 1018 that extend the length of the tunnel 32. As illustrated in FIG. 14, the protection rail 1020 is formed from extruded aluminum and extends from a first proximal end 1040 to a second distal end 1042. At the first proximal end 1040, a tapered or angled portion 1044 extends from the first proximal end 1040. The tapered portion 1044 tapers to a maximum height portion 1046. The tapered portion 1044 includes a plastic or ultra high molecular weight polyethylene insert 1048 positioned on the tapered portion 1044 having a low friction engagement surface 1049. This plastic portion 1048 provides the smooth low friction surface 1049 for engaging the track 30 adjacent to the track protection cover 1010 where reduced clearance within the tunnel 32 exists. Alternatively, a low friction aluminum plate can be attached in this area by way of welding, fasteners, or adhesive.

Once the track 30 rotates about the track protection cover 1010, the track 30 is generally flat when riding adjacent to the planar lower surface 1004 of the tunnel 32. The planar maximum height portion 1046 includes a track engaging surface, wall, or portion 1050 that rides against the track 30 during rotation of the track 30. The protection rail 1020 further includes a spaced apart tunnel engaging surface, wall, or portion 1052 that directly contacts the tunnel 32 and is positioned substantially along the attachment channel 1028. Opposed rail sidewalls 1051 connect the tunnel engaging wall 1052 to the track engaging wall 1050. Since the protection rail 1020 is primarily formed of extruded aluminum, except for the angled plastic engaging portion 1048, and the tunnel 32 is formed from aluminum, heat conduction between the tunnel 32 and the protection rail 1020 is achieved by this direct contact. This allows the protection rail 1020 to act essentially as a heat sync to radiate heat from each cooling duct 1018, as opposed to prior art stud protection systems that use a plastic component that substantially covers the cooling ducts and acts as an insulator which may not be desirable. The protection rail 1020 also defines an air duct or channel 1053 that extends through the entire length of the protection rail 1020 enabling air to be circulated through the protection rail 1020 providing additional cooling benefits for the cooling fluid passing through the cooling ducts 1018.

Figure 7:
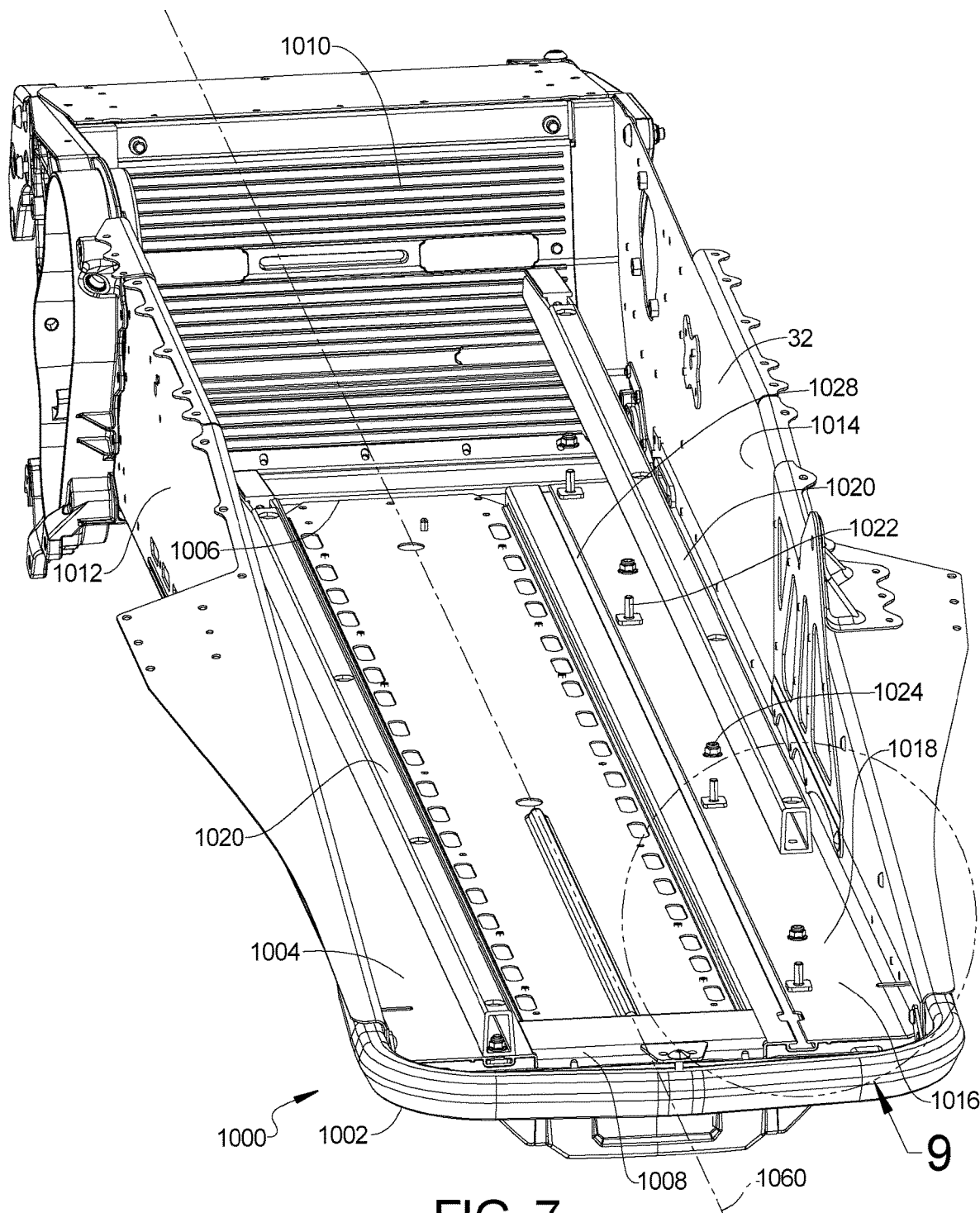
FIG. 7 is an exploded perspective view illustrating a tunnel stud protection system in accordance with the present disclosure.
Figure 8:
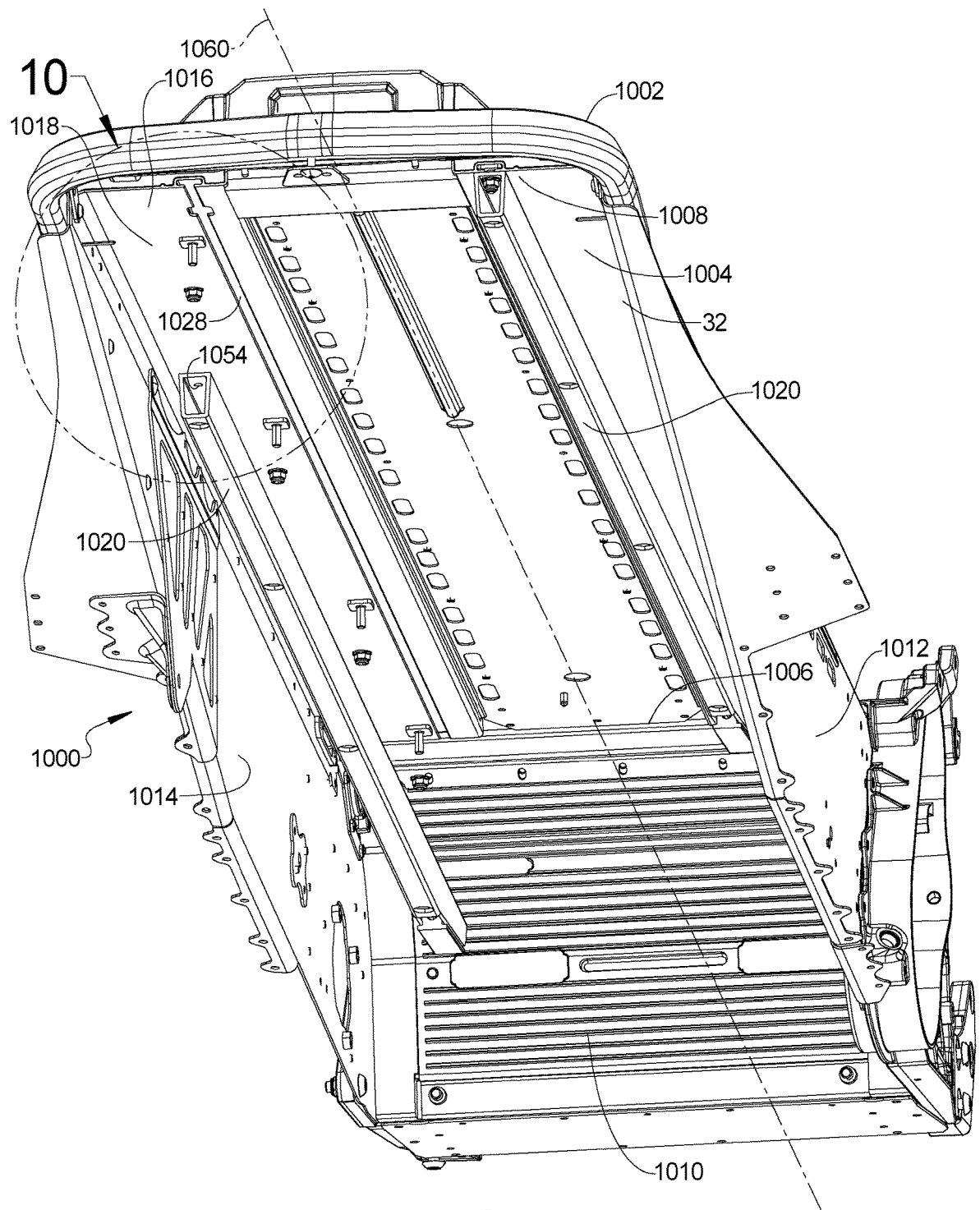
FIG. 8 is another exploded perspective view of the tunnel stud protection system of the present disclosure.
Figure 11:
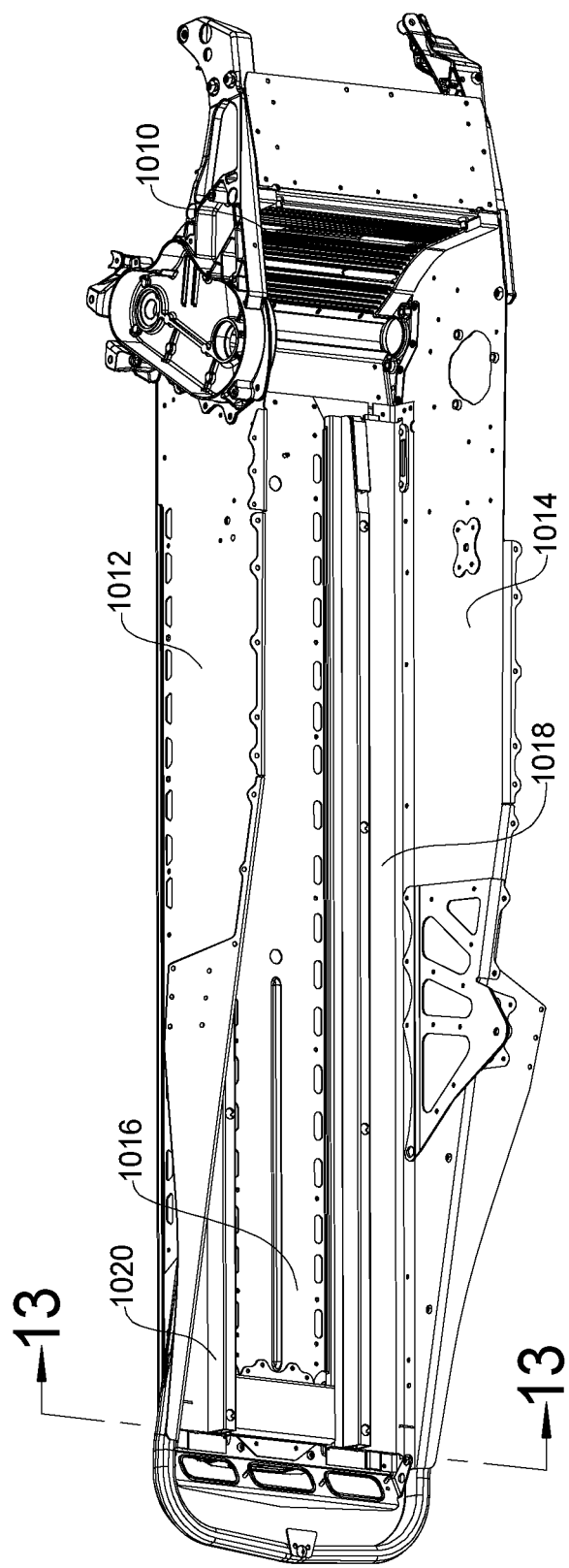
FIG. 11 is an assembled perspective view of the tunnel stud protection system of the present disclosure.
Figure 12:
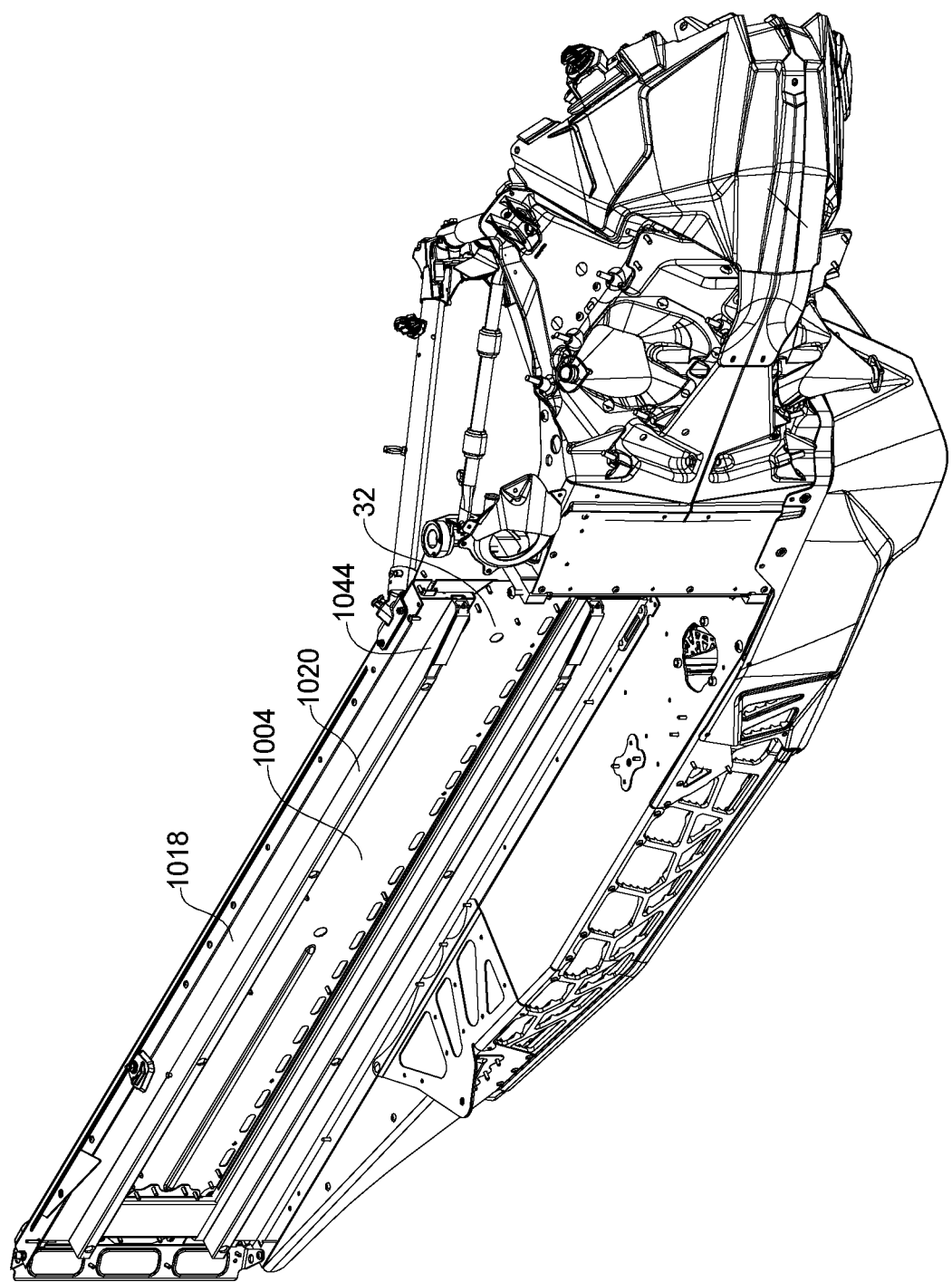
FIG. 12 is another assembled perspective view of the tunnel stud protection system of the present disclosure.

In order to attach the protection rail 1020 to the tunnel 32, multiple square headed bolts 1022 having square heads 1026 are passed through opening 1038 and slid axially along the T-shaped slot 1030 of the attachment channel 1028, as illustrated in FIGS. 7 and 8. With each spaced apart bolt 1022 extending from the attachment channel 1028, the protection rail 1020 having bolt holes 1054 that extend through tunnel engaging wall 1052 is axially aligned with each bolt 1022. This allows a threaded portion 1056 of the bolt 1022 to pass through the bolt hole 1054 and extend within the air flow channel 1053, as illustrated in FIG. 13B. The protection rail 1020 also defines a plurality of concentric access holes 1058 extending through the track engaging wall 1050. Each access hole 158 is sized to enable the locking nut 1024 to pass through, as well as an appropriate tool such as a socket for tightening the locking nut 1024 relative to the bolt 1022. Since the bolt 1022 is rotationally fixed via the parallel side walls 1034 and the square head 1026, a user simply needs to tighten the locking nut 1024 without the need for grasping the bolt 1022. This allows each protection rail 1020 to be easily installed to the tunnel 32 by a user without the need for removing the track 30 or other components by simply sliding the bolts 1022 along the attachment channel 1028 and axially passing the protection rail 1020 until the holes 1054 are aligned with the bolt 1022 and thereafter secure the corresponding locking nuts 1024.

Referring now to FIGS. 11-13B, the tunnel stud protection system 1000 is illustrated in an assembled view with the tunnel 32. As illustrated, there are two protection rails 1020 that extend substantially parallel to one another and parallel to a longitudinal axis 1060 of the tunnel 32. As illustrated in FIGS. 13A and 13B, each protection rail 1020 is positioned longitudinally relative to track clips 1062 of the track 30. Each track clip 1062 enables the track sections of the track 30 to flex in these area where windows or passages also extend through the track 30 adjacent to the track clips 1062. This enables further clearance or access to each access hole 1058 when installing each protection rail 1020.

As illustrated in FIGS. 13A and 13B, studs 1064 are illustrated extending from the track 30. The studs 1064 generally have varying heights but can extend at about 9.525 mm above the lugs 1066 of the track 30. Each protection rail 1020 has a height 1068 that provides sufficient clearance to prevent the studs 1064 from engaging the lower surface 1004 of the tunnel 32. As noted in FIG. 14, the protection rail 1020 includes the tapered portion 1044 at a first proximal end 1006 of the tunnel where the clearance for the track decreases in this area thus requiring the tapered portion 1044 having a low friction polymer to engage the track 30 in this area. As the rail 1020 moves distally, the height changes from a first height 1067 of about 22 mm to the maximum height portion 1046 having a second height 1068 of about 35 mm, where full track clearance relative to the lower surface 1004 of the tunnel 32 is provided. As noted in FIG. 13B, the studs 1064 can be positioned anywhere on the track 30 both on the inside and outside areas relative to the protection rail 1020, except where the track engaging surface, wall, or portion 1050 is located. This way, track engaging portion 1050 that is aluminum only is configured to engage the track 30 and not come into contact with any studs 1064.

Referring to FIGS. 15A and 15B, an additional embodiment of a protection rail 1068 is illustrated. Like reference numerals will be used to describe like structures with protection rail 1020. Protection rail 1068 is substantially similar to protection rail 1020 except that protection rail 1068 has an additional variable height feature 1070. The variable height feature 1070 includes an additional ultra high molecular weight polyethylene extension 1072 that is attached to the second distal end of the protection rail 1068. The ultra high molecular weight spacer 1072 is attached by way of rivets 1074 and adds about 16 mm of additional clearance. Again, the extension can also be formed from aluminum or other appropriate material. Thus, the protection rail 1068 provides for a first variable height area or feature at the tapered portion 1044, an intermediate height portion 1046, and an extension or further max height portion formed by the spacer 1072. In other words, the protection rail 1068 has three different areas for three different clearance heights (22 mm, 35 mm, and 51 mm) spaced along the length of the protection rail 1068. Protection rail 1068 is generally used when there is a very deep lug track 30 employed that has significant suspension travel of the track 30, thus requiring further clearance in the distal end or rear of the tunnel 32 for the studs 1064 and the deep lugs.

The tunnel stud protection system 1000 provides for tunnel stud protection when employing studs 1064 on a track 30 used with a snowmobile 10. Such a system 1000 provides maximum clearance within the tunnel 32 when not in use because there is no protruding fasteners or mechanisms for attaching a stud protection spacer. By further providing an aluminum protection rail 1020 or 1068, heat conduction between the aluminum tunnel 32 and the protection rails 1020 or 1068 is achieved by providing additional cooling of the cooling fluid passing through the cooling ducts 1018 that are in contact with the protection rails 1020 or 1068. The air passthrough 1053 along each rail 1020 or 1068 provides additional cooling features. Assembly or attachment of the protection rails 1020 or 1068 is also easily achieved with the tunnel stud protection system 1000, as illustrated. This is because the bolts 1022 can be easily adjustably positioned within the attachment channels 1028, the corresponding protection rail 1020 aligned with the bolts and the locking nuts 1024 passed through the access holes 1058 without the need for removing the track 30 or other components of the snowmobile 10. The elongated attachment channel 1028 also allows adjustability of positioning protection rails 1020 that can extend the entire length of the tunnel 32 or attaching multiple separate independent protection rails along the same attachment channel 1028 at different locations along the tunnel 32 and not require them to extend along the entire length, should this be desired or optimal. In other words, the protection rails can have different lengths and heights as needed. Additionally, various sets of protection rails can be provided to account for different height studs or different track configurations such as the protection rails 1020 and 1068 that can easily be swapped out or switched depending on the track and studs utilized. Accordingly, the disadvantage associated with existing stud protection systems have been substantially reduced or eliminated.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A snowmobile tunnel stud protection system to provide protection from a studded endless track, the tunnel stud protection system comprising:
    a tunnel extending along a longitudinal axis from a first proximal tunnel end to a second distal tunnel end, the tunnel defining at least one attachment channel formed into an undersurface of the tunnel;
    at least one protection rail extending from a first proximal rail end to a second distal rail end, the at least one protection rail defining a plurality of holes passing through the protection rail; and
    a plurality of fasteners, each fastener having a first fastener portion configured to slide along and be positioned in the at least one attachment channel and a second fastener portion coupled to the first fastener portion;
    wherein each first fastener portion of each fastener passes through one of the plurality of holes;
    wherein each second fastener portion of each fastener couples to a corresponding first fastener portion of each fastener to couple the at least one protection rail to the at least one attachment channel formed in the tunnel.

2. The snowmobile tunnel stud protection system of claim 1, wherein the at least one attachment channel is a slot that has a T-shaped cross-sectional shape.

3. The snowmobile tunnel stud protection system of claim 2, wherein an opening of the at least one slot extends along the tunnel and is substantially flush with the undersurface of the tunnel.

4. The snowmobile tunnel stud protection system of claim 3, wherein the at least one slot extends from the first proximal tunnel end to the second distal tunnel end and defines a fastener opening extending into the undersurface of the tunnel and configured to receive the first fastener portion of each fastener.

5. The snowmobile tunnel stud protection system of claim 1, wherein each first fastener portion is a threaded bolt and each second fastener portion is a lock nut.

6. The snowmobile tunnel stud protection system of claim 5, wherein each threaded nut includes a rectangular head configured to be rotationally fixed in the at least one attachment channel.

7. The snowmobile tunnel stud protection system of claim 1, wherein the tunnel defines at least one cooling duct formed into a top plate of the tunnel, the at least one attachment channel formed into the cooling duct of the tunnel.

8. The snowmobile tunnel stud protection system of claim 7, wherein the cooling duct extends from the first proximal tunnel end to the second distal tunnel end and the at least one attachment channel is formed into the cooling duct from the first proximal tunnel end to the second distal tunnel end.

9. The snowmobile tunnel stud protection system of claim 1, wherein the at least one protection rail includes a tunnel engaging wall and a spaced apart opposed track engaging wall with a pair of opposed rail sidewalls connecting the tunnel engaging wall and the track engaging wall.

10. The snowmobile tunnel stud protection system of claim 9, wherein the at least one protection rail defines an airflow passthrough extending along a length of the at least one protection rail defined by the tunnel engaging wall, the opposed track engaging wall, and the pair of opposed rail sidewalls.

11. The snowmobile tunnel stud protection system of claim 10, wherein each of the plurality of holes includes a first bolt passing hole extending from the tunnel engaging wall and a concentric nut passing hole extending through the track engaging wall configured to receive a bolt of the first fastener portion and a nut of the second fastener portion, respectively.

12. The snowmobile tunnel stud protection system of claim 1, wherein the at least one protection rail includes a proximal tapered portion having a low friction bearing surface formed thereon.

13. The snowmobile tunnel stud protection system of claim 12, wherein the low friction surface is formed by a plastic insert coupled to the at least one protection rail at the tapered proximal portion.

14. The snowmobile tunnel stud protection system of claim 1, wherein the at least one protection rail extends along a length from the first proximal tunnel end to the second distal tunnel end.

15. The snowmobile tunnel stud protection system of claim 14, wherein the at least one protection rail has a varying height that varies from a first tapered proximal portion, to an intermediate planar portion to a stepped distal portion.

16. The snowmobile tunnel stud protection system of claim 15, wherein the tapered proximal portion includes a polymer insert and the distal step portion includes a polymer insert.

17. The snowmobile tunnel stud protection system of claim 1, wherein the tunnel is formed from aluminum and the at least one protection rail is substantially formed from aluminum, wherein the at least one protection rail is configured to conduct heat from a cooling duct formed in the tunnel.

18. A snowmobile tunnel stud protection system to provide protection to a tunnel from a studded endless track, the tunnel having at least one attachment channel formed into an undersurface of the tunnel, the tunnel stud protection system comprising:
    at least one protection rail extending from a first proximal rail end to a second distal rail end, the at least one protection rail having a tunnel engaging wall and a spaced apart opposed track engaging wall with a pair of opposed rail sidewalls connecting the tunnel engaging wall and the track engaging wall to define an airflow passthrough extending along a length of the at least one protection rail, the tunnel engaging wall defining a plurality of tunnel engaging holes and the track engaging wall defining a plurality of track engaging holes;
    a plurality of bolts configured to be positioned in the at least one attachment channel formed in the undersurface of the tunnel, each bolt configured to pass through a corresponding tunnel engaging hole; and
    a plurality of nuts, each nut configured to attach to a corresponding bolt, each nut sized to pass through a corresponding track engaging hole;
    wherein each nut couples to a corresponding bolt to attach the at least one protection rail to the tunnel.

19. The snowmobile tunnel stud protection system of claim 18, wherein the at least one protection rail is formed from an extruded aluminum and configured to conduct heat from a cooling duct formed in the tunnel.

20. The snowmobile tunnel stud protection system of claim 18, wherein the at least one rail includes a proximal tapered portion having a polymer insert having a low friction engagement surface configured to engage the endless track.

* * * * *